T. G. KELSO.
CORN HARVESTER.
APPLICATION FILED APR. 27, 1910.

995,258.

Patented June 13, 1911.
4 SHEETS—SHEET 1.

Witnesses
E. G. McKee
V. B. Hillyard.

Inventor
Thomas G. Kelso
By Victor J. Evans
Attorney

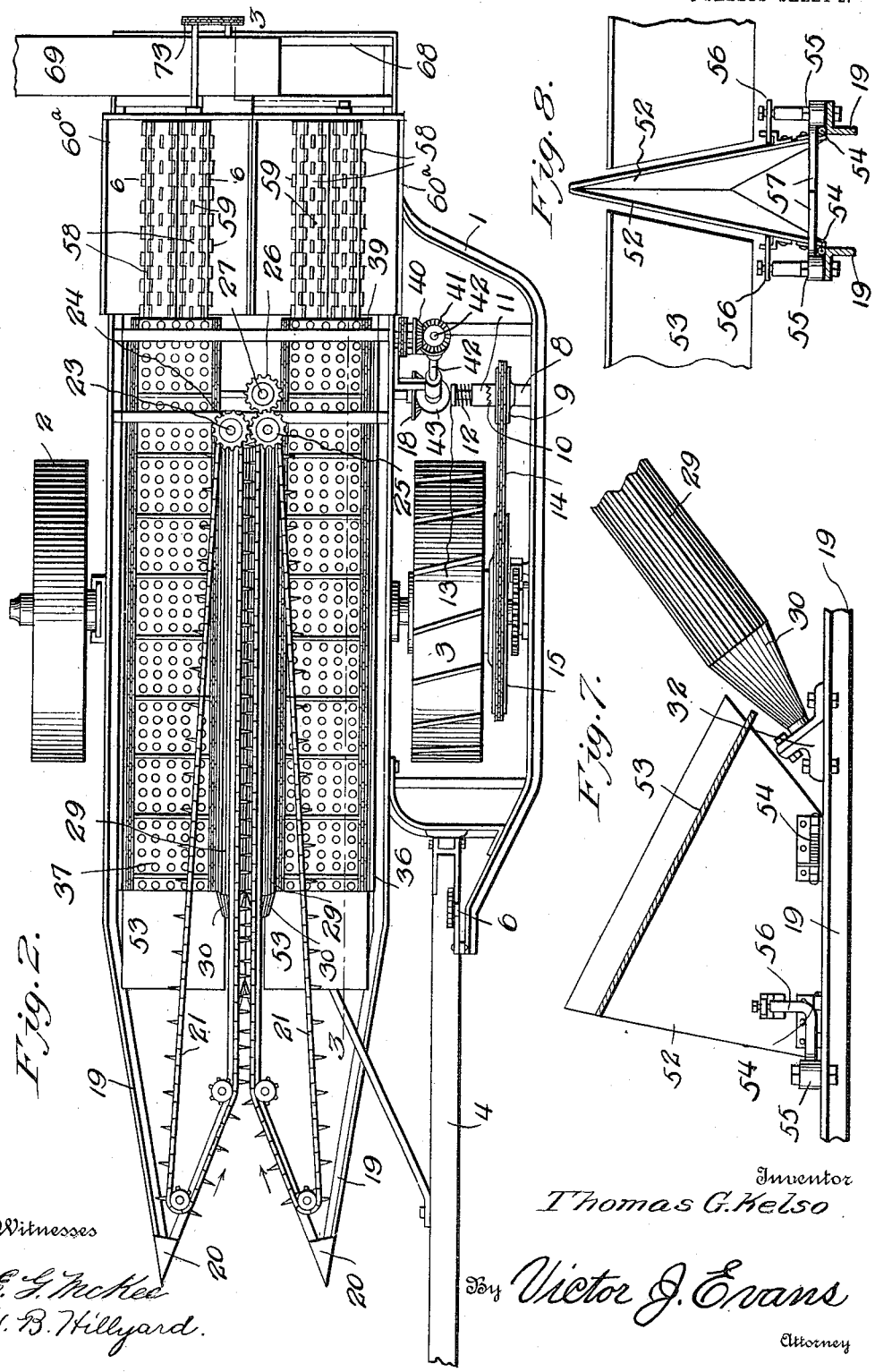

T. G. KELSO.
CORN HARVESTER.
APPLICATION FILED APR. 27, 1910.
995,258.
Patented June 13, 1911.
4 SHEETS—SHEET 3.
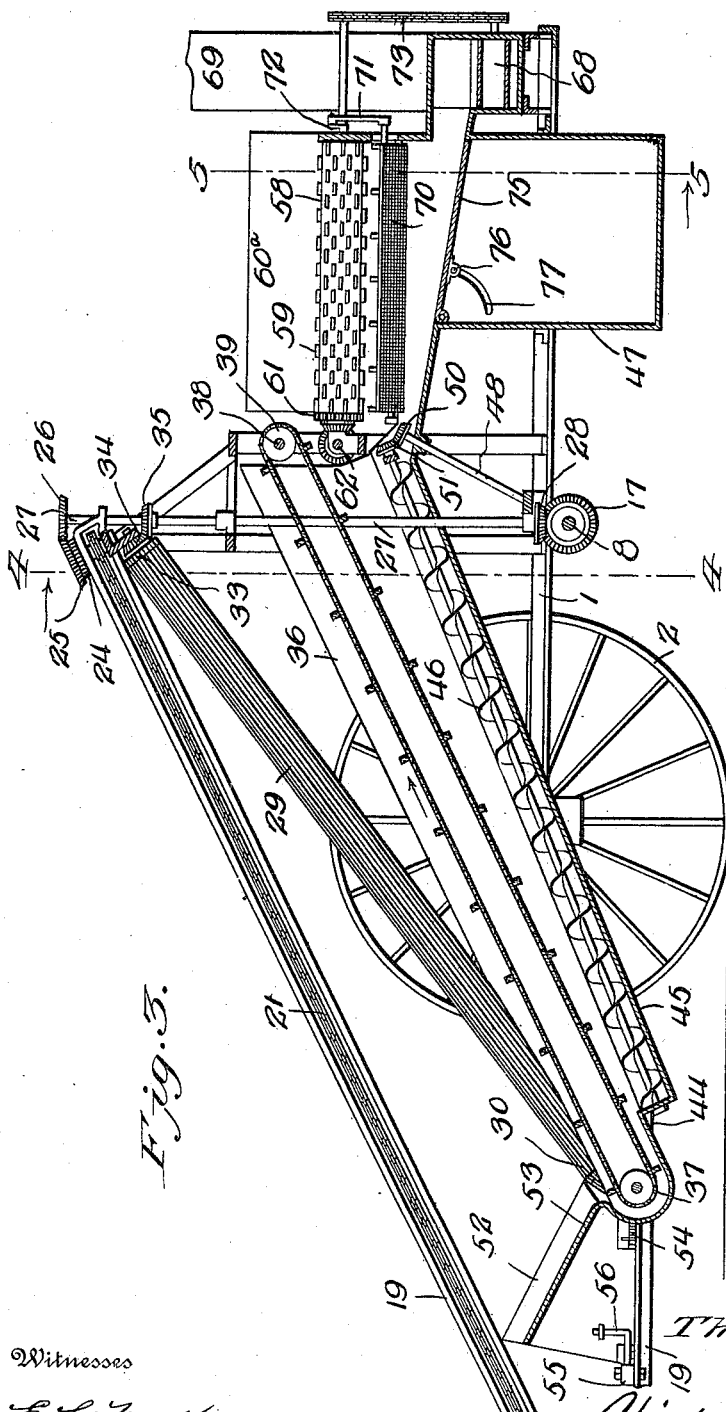
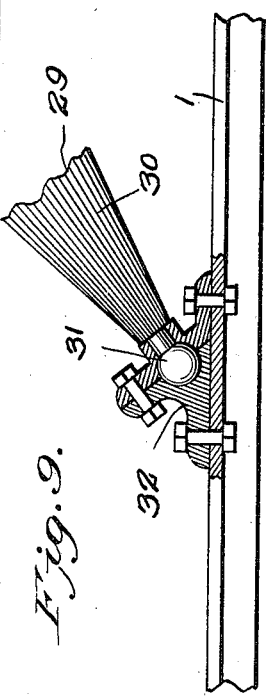
Witnesses
E. F. McKee
V. B. Hillyard.
Inventor
Thomas G. Kelso
By Victor J. Evans
Attorney

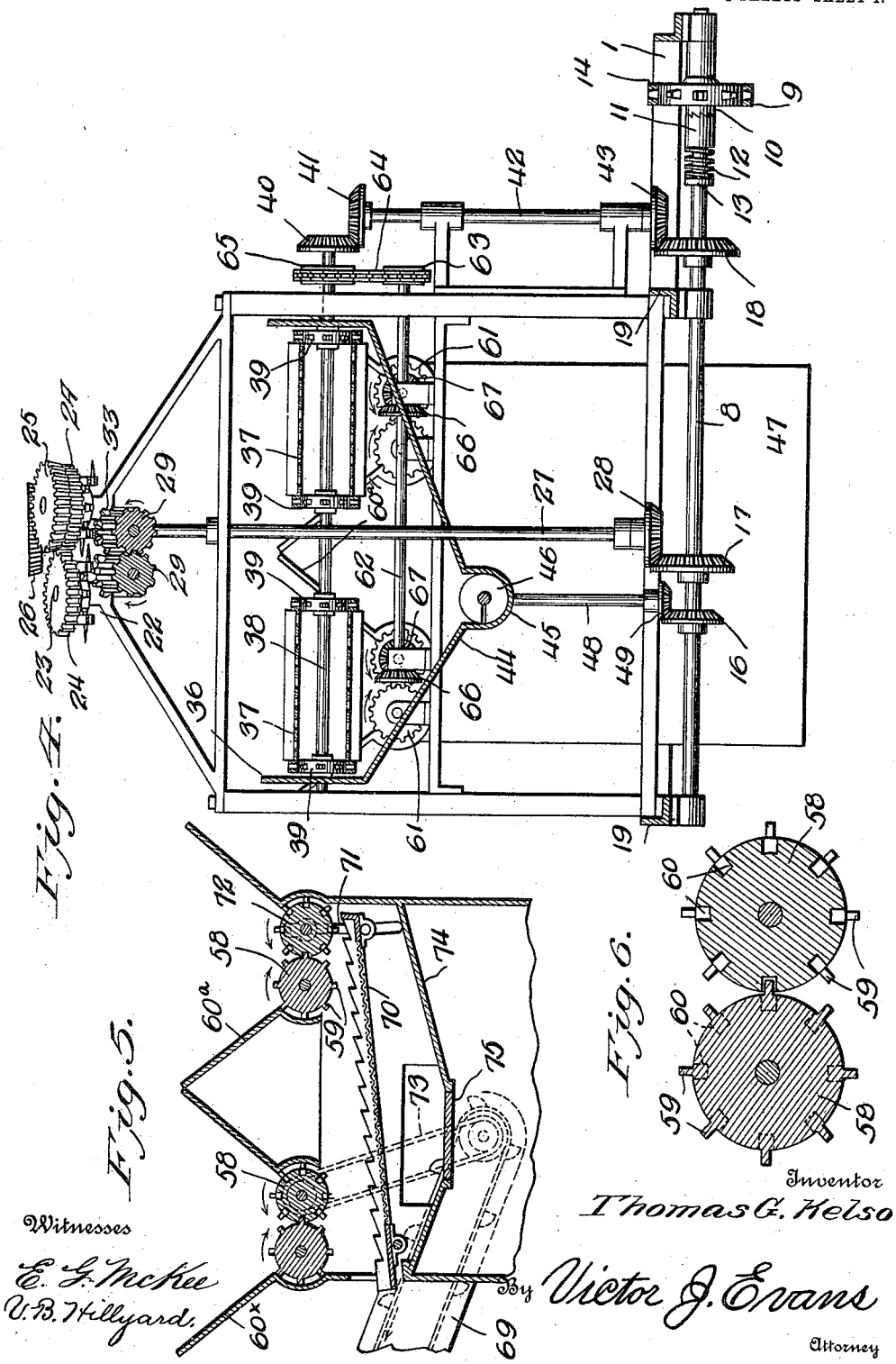

UNITED STATES PATENT OFFICE.

THOMAS G. KELSO, OF NEW SALEM, INDIANA.

CORN-HARVESTER.

995,258. Specification of Letters Patent. Patented June 13, 1911.

Application filed April 27, 1910. Serial No. 557,956.

*To all whom it may concern:*

Be it known that I, THOMAS G. KELSO, a citizen of the United States, residing at New Salem, in the county of Rush and State of Indiana, have invented new and useful Improvements in Corn-Harvesters, of which the following is a specification.

This invention appertains to agricultural machinery and more particularly to implements designed for operation in the field for gathering the crop and in its specific adaptation the invention has relation to machines for harvesting corn and divesting the ears of the husks.

The invention provides a machine of the variety herein stated which involves a compact arrangement of the parts and which admits of access being readily had to the elements both for airing, cleaning, and oiling and for other purposes requiring inspection of the component parts of the machine.

The invention also contemplates a machine of the character aforesaid which is easy of operation, light of draft and efficient in operation and which will prevent the waste of any of the ears or the grains in the event of the latter becoming detached from the ears during the harvesting or husking operations.

The invention consists of the novel features, details of construction and combination of parts, which hereinafter will be more particularly set forth, illustrated in the accompanying drawings, and pointed out in the appended claims.

Figure 1:
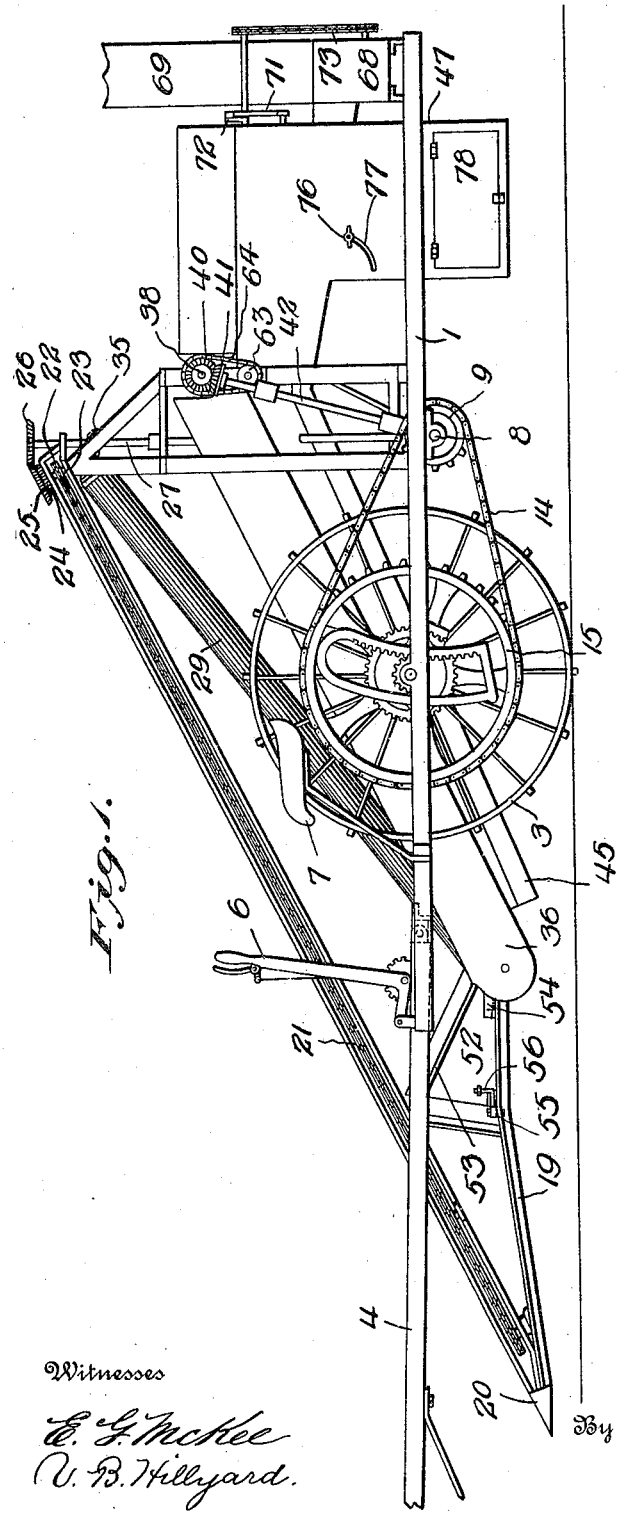
Figure 10:
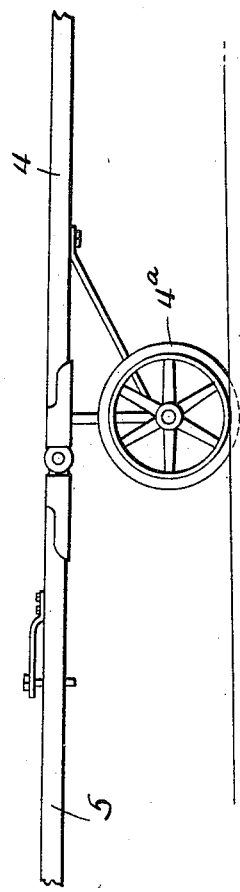

Referring to the drawings, forming a part of the application, Figure 1 is a side view of a corn harvesting and husking machine embodying the invention. Fig. 2 is a top plan view of the machine. Fig. 3 is a vertical longitudinal section on the line 3—3 of Fig. 2, showing the parts on a larger scale. Fig. 4 is a transverse section on the line 4—4 of Fig. 3, looking to the rear. Fig. 5 is a cross section on the line 5—5 of Fig. 3 looking rearward. Fig. 6 is a cross section of a pair of husking rolls on the line 6—6 of Fig. 2, showing the same on a larger scale. Fig. 7 is a sectional view of the retainer and lower end of a snapping roll on a larger scale. Fig. 8 is a front view of the retainer and the mountings and actuating means therefor. Fig. 9 is a sectional detail of the bearing for the lower end of a snapping roll. Fig. 10 is a detail view of the rear portion of the pole or tongue and the front portion of the frame, showing the truck for supporting the latter.

Corresponding and like parts are referred to in the following description, and indicated in all the views of the drawings, by the same reference characters.

The machine comprises a frame 1, which may be of suitable construction and which is mounted upon ground wheels 2 and 3 and a truck 4$^a$, said frame being vertically adjustable to admit of adjusting the working parts to any desired distance from the surface of the ground. One of the ground wheels, as 3, constitutes a driver and the power for operating the working parts is derived therefrom. The frame 1 is provided at its forward end with a pivoted section 4 to which the pole or tongue 5 is connected in the usual manner, said pivoted section 4 being provided at or near its front end with the truck 4$^a$, which latter in effect supports the front portion of the machine and relieves the team of the weight thereof.

The main frame 1 is adapted to tilt about a horizontal axis coinciding with the centers of the wheels 2 and 3, so that the front portion may be raised or lowered without requiring the bodily adjustment of the frame 1 upon the axes of the wheels 2 and 3. An operating lever 6 is mounted upon the rear portion of the pivoted section 4 and is connected by means of a link to the front portion of the main frame 1 and by manipulating the operating lever 6 the joint formed between the parts 1 and 4 may be turned to move said parts to bring the front portion of the operating mechanism to the required distance from the surface of the ground. The driver's seat 7 is mounted upon the front portion of the main frame 1 within convenient reach of the operating lever 6. A transverse shaft 8 is located in the rear of the supporting wheels 2 and 3 and is mounted in suitable bearings applied to the main frame. A sprocket wheel 9 is mounted loosely upon the shaft 8 and has a half clutch 10 upon one side, which coöperates with a half clutch 11 keyed to the shaft 8 and mounted to move freely thereon, being held in engagement with the half clutch 10 by means of a spring 12, which is mounted upon the shaft 8 and confined between the half clutch 11 and a collar or shoulder 13. A sprocket chain 14 connects the sprocket wheel 9 with a sprocket wheel 15 secured to the drive wheel 3 so as to turn therewith. In the event of the machine being backed the teeth of the clutch member 11 ride upon the teeth of the clutch member 10, thereby preventing rotation of the shaft 8 and the working parts. Bevel gear wheels 16, 17 and 18 are secured to the shaft 8 so as to rotate therewith.

Guards 19 are mounted upon the machine frame and incline upwardly and rearwardly and are transversely spaced to form a passage through which the stalks pass in the operation of the machine. The front portions of the guards 19 flare to form a mouth to receive the stalks and direct the same into a passage formed between the guards. The lower forward ends of the guards 19 terminate in points 20, which are adapted to pass beneath any stalks that may incline or tend to lie upon the ground so as to elevate the same and cause them to enter the passage formed between the guards 19. Each of the guards 19 consists of a suitable framework and the opposing sides may be of any formation so as to support the stalks and direct the same to the snapping rolls whereby the ears are detached from the stalks, the latter passing between the snapping rolls in the progress of the machine over the field, it being understood that the stalks are left standing. Carrier chains 21 are mounted upon the guards 19 and are supported upon suitable sprocket idlers in a manner to admit of the portions bordering upon the passage formed between the guards 19 conforming to said passage so as to positively move the stalks therethrough. The carrier chains 21 are toothed or provided at intervals in their length with points, which engage the stalks and carry the same through the passage in a rearward direction. The carrier chains are positively driven by means of sprocket wheels 22 which are secured to short shafts 23 located at the upper rear ends of the guards 19 and which shafts have spur wheels 24 fastened thereto and in mesh. One of the shafts 23 has a bevel gear 25 secured thereto which is in mesh with a bevel gear 26 secured to the upper end of a vertical shaft 27, which has a bevel gear wheel 28 at its lower end in mesh with the bevel gear wheel 17 mounted on the shaft 8.

A pair of snapping rolls 29 are arranged in line with the passage formed between the guards 19 and incline upwardly and rearwardly and are mounted at their lower ends in bearings provided near the front of the frame and at their upper rear ends in bearings at or near the upper rear ends of the guards 19. The snapping rolls 29 are fluted or corrugated throughout their length so as to make positive engagement with the stalks to pull the same downward and insure a snapping of the ears therefrom. The lower ends of the snapping rolls are tapered, as indicated at 30, with the result that the receiving space is flared, thereby directing the stalks between the snapping rolls and facilitating their entrance between such rolls in the operation of the machine. The lower ends of the snapping rolls are contracted and terminate in balls 31, which are mounted in bearings 32, which comprise two parts, as shown most clearly in Figs. 7 and 9 between which the balls 31 are held, thereby preventing longitudinal movement of the snapping rolls. The parts comprising the bearings 32 are bolted to one another and to the framework 1. The upper rear ends of the snapping rolls may be mounted in any manner and are provided with spur gear wheels 33, which are in meshing relation, one of the snapping rolls being further provided with a bevel gear wheel 34, which is in mesh with a bevel gear wheel 35 secured to the upper portion of the vertical shaft 27. The snapping rolls 29 are rotated so that their inner upper portions travel inwardly and downwardly, thereby drawing the stalks between them.

Elevators are located upon opposite sides of the passage formed between the guards 19, so as to receive the ears detached from the stalks and carry the same upwardly to the husking mechanism. Each of the elevators comprises a frame 36 and an endless apron 37, the latter being provided at intervals with lags or other projecting parts to engage with the ears and carry the same upwardly and rearwardly. The endless aprons 37 are perforated so as to provide passages for the escape of any grains that may be detached from the ears during the snapping operation. The elevators receive the ears when detached from the stalks. The elevators incline upwardly and rearwardly and are positively driven so that the upper portions of the endless aprons 37 move rearwardly. A shaft 38 is located transversely of the machine and is provided with sprocket wheels 39, which are fastened thereto and around which the endless aprons 37 pass. The shaft 38 is provided at one end with a bevel gear 40, which meshes with a companion bevel gear 41 secured to the upper end of an upright shaft 42, which has a bevel gear 43 fastened to its lower end and in mesh with the bevel gear 18 mounted upon the shaft 8. A pan 44 is located beneath the elevators and comprises oppositely inclined portions and a trough 45, in which latter a screw elevator 46 is arranged to operate for conveying the loose grain to a receptacle 47 at the rear of the machine. The pan 44 extends substantially the entire length of the elevators. The screw elevator 46 is adapted to be driven from the shaft 8 by means of a shaft 48, which is provided at its lower end with a bevel gear 49 in mesh with the bevel gear 16 fast to the shaft 8 and a bevel gear 50 fast to the upper end of the shaft 48 and in mesh with a bevel gear 51 secured to the upper rear end of the shaft of said screw elevator.

In order to prevent the loss of any ears that may be snapped from the stalks a retainer is provided and located in front of the lower ends of the snapping rolls. The retainer comprises two wings 52 which incline inwardly and upwardly and have their lower edges spaced apart and hinged to parallel bars of the main frame located upon opposite sides of the passageway formed between the guards 19. The wings 52 have their upper edges rearwardly and downwardly inclined and said wings touch along their upper edges. Plates 53 are located upon opposite sides of the wings 52 and incline rearwardly and downwardly so as to catch any ears that may reach the lower ends of the snapping rolls after being detached so as to direct said ears toward the elevators to be taken up thereby. The wings 52 have a limited movement between the inner edges of the plates 53 and are normally held with their upper edges in contact by means of spring hinges 54. The wings 52 are adapted to be opened at their upper edges by the stalks when passing between them. Bell cranks 55 are mounted upon the bars of the frame 1 to which the wings 52 are hinged and have their arms 56 connected to the wings and their other arms 57 arranged to extend across the space formed between the lower edges of said wings so as to be engaged by the stalks, whereby the inner ends of the arms 57 are moved rearwardly, thereby causing a spreading of the wings 52 at their upper edges. When the stalks clear the arms 57, the latter spring forward, thereby retaining the stalks which continue to move between the wings 52 and between the snapping rolls, the latter detaching the ears from the stalks. The wings 52 serve to close the space formed between the deflecting plates 53, thereby preventing any loss of the ears snapped from the stalks after passing by the upper forward ends of the plates 53 and the latter in turn serving to direct any loose ears reaching them toward the elevators to be taken up thereby.

Pairs of husking rolls 58 are located in the rear of the snapping rolls. Each of the husking rolls is studded in its length with short ribs or projections 59 and corresponding depressions 60, the short ribs or projections 59 of one roll being arranged to match the depressions 60 of the other roll, as indicated most clearly in Fig. 6. The ribs 59 are designed to take hold of the husks and strip the same from the ears of corn without injuring the grain. A pair of husking rolls 58 are provided for each elevator and said rolls have a longitudinal arrangement and are driven so that their upper inner portions travel toward one another so as to pull the husks from the ears. Guards 60$^a$ extend along opposite sides of the pairs of husking rolls and serve to retain the ears and direct the same to the husking rolls so as to insure a stripping of the husks from the ears. The husking rolls are arranged so as to receive the ears from the respective elevators. The pairs of husking rolls are connected by means of intermeshing gears 61, which are secured thereto. One of the husking rolls of each pair is geared to a transverse shaft 62, which is provided at one end with a sprocket wheel 63 around which passes a sprocket chain 64, which makes connection with a sprocket gear 65 fastened to the shaft 38. Bevel gear wheels 66 secured upon the shaft 62 mesh with companion bevel gear wheels 67 fastened to the shafts of one of the husking rolls of each pair. By the means just described motion is transmitted to the husking rolls to operate the same in unison.

A hopper 68 is located in the rear of the husking mechanism to receive the ears of corn after the same have been divested of their husks. An elevator 69 connects with the hopper 68 to convey the ears to a wagon or other receptacle located at one side of the machine to receive the said ears. Any grain detached from the ears during the husking operation is received upon a grid 70, which separates the grain from the husks. The grid 70 is mounted to receive a vibratory motion, being connected by means of a pitman 71 with a crank 72 upon the rear end of one of the husking rolls. The elevator 69 may be driven in any manner and the shaft supporting the lower end of the endless apron is connected by means of a sprocket drive belt 73 with the shaft of one of the husking rolls. The grain from the grid 70 may discharge upon a chute 74 and be directed to the elevator 69 or said grain may pass into the receptacle 47. The chute 74 has a pivoted portion 75, which constitutes a top or cover for the receptacle 47. The cover 75 is hinged at one end and is adapted to be adjusted at its opposite end and may be secured in the required adjusted position by means of a fastening 76, which is arranged to operate in a slot 77 formed in a side of the receptacle 47. When the cover 75 is raised the grain from the trough 45 passes thereover into the hopper 68, thence to the receptacle by means of the elevator 69. The grain may be removed from the receptacle 47 by means of a door 78.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In a corn harvester and in combination with a pair of snapping rolls, a retainer located in front of the snapping rolls and comprising wings oppositely inclined to the vertical, with their lower edges spaced apart and hinged, and inwardly and laterally inclined toward their upper longitudinal edges which touch and incline upwardly and forwardly throughout their length, and means for yieldingly pressing the wings together at their upper longitudinal edges.

2. In a corn harvester and in combination with a pair of snapping rolls, a retainer located in front of the snapping rolls and comprising wings oppositely inclined to the vertical, with their lower edges spaced apart and hinged, and inwardly and laterally inclined toward their upper longitudinal edges which touch and incline upwardly and forwardly throughout their length, means for yieldingly pressing the wings together at their upper longitudinal edges, and means adapted to be actuated by the stalks for effecting a lateral spreading of the wings along their upper longitudinal edges.

3. In a corn harvester, the combination with the snapping rolls, of a pair of wings upwardly and inwardly inclined, spaced at their lower edges and touching at their upper edges, means for yieldingly pressing said wings together at their upper edges, and bell cranks mounted upon the main frame and each having one of its arms connected with one of the wings and having its other arm extending inwardly across the path of the stalks to be engaged thereby to effect a spreading of the wings at their upper edges.

4. In a corn harvester, the combination of snapping rolls, elevators located upon opposite sides of the snapping rolls, deflecting plates located in advance of the lower ends of the elevators and having their inner edges spaced apart, and plates located in the space formed between said deflecting plates and upwardly and inwardly inclined, said plates being spaced at their lower edges and touching at their upper edges.

5. In a corn harvester, the combination of snapping rolls, elevators located upon opposite sides of the snapping rolls, deflecting plates located in advance of the lower ends of the elevators and having their inner edges spaced apart, plates located in the space formed between said deflecting plates and upwardly and inwardly inclined, said plates being spaced at their lower edges and touching at their upper edges, means for yieldingly pressing the plates together at their upper edges, and means adapted to be operated by the stalks to effect a spreading of the plates at their upper edges.

6. In a corn harvester, the combination of snapping rolls, husking rolls located in the rear of the snapping rolls, an elevator for receiving the ears when detached and directing the same to the husking rolls, a receptacle located below the husking rolls to receive loose grain, a pan located below the elevator to receive loose grain and direct the same to the said receptacle, a cover for closing said receptacle and forming a support for the grain to direct the same over the receptacle, a hopper in the rear of the receptacle and husking rolls arranged to receive the loose grain when the cover of the loose grain receptacle is closed, and an elevator for carrying the material from said hopper to effect discharge thereof into a receptacle at one side of the machine.

In testimony whereof I affix my signature in presence of two witnesses.

THOS. G. KELSO.

Witnesses:
  A. C. Ross,
  Chas. W. Wilson.

---

Copies of this patent may be obtained for five cents each, by addressing the "Commissioner of Patents, Washington, D. C."